May 13, 1969   J. W. O'BRIEN   3,443,770
EXPANDABLE MANDREL

Filed Nov. 13, 1967   Sheet 1 of 2

INVENTOR.
JEREMIAH W. O'BRIEN
BY
Henry C. Westin
ATTORNEY.

INVENTOR.
JEREMIAH W. O'BRIEN
BY
Henry C. Westin
ATTORNEY.

United States Patent Office 3,443,770
Patented May 13, 1969

---

3,443,770
EXPANDABLE MANDREL
Jeremiah Wagner O'Brien, Pittsburgh, Pa., assignor to United Engineering and Foundry Company, Pittsburgh, Pa., a corporation of Pennsylvania
Filed Nov. 13, 1967, Ser. No. 682,190
Claims priority, application Great Britain, Nov. 17, 1966, 51,622/66
Int. Cl. B65h 75/18
U.S. Cl. 242—72.1
3 Claims

ABSTRACT OF THE DISCLOSURE

A collapsible mandrel comprising a central rotatable arbor around which are mounted a number of segments movable in a radial direction. Radial displaceable members are received in bores in the arbor and have first wedge surfaces. An actuating rod passes through the center of the arbor and has wedge surfaces to engage the first wedge surfaces to cause expansion of the segments.

---

The present invention relates to a reel or mandrel adapted for use in coiling strip material, say for example, in conjunction with a hot coiler for receiving and coiling hot rolled strip.

Present-day mandrels employed in hot strip coilers are exposed to very severe conditions which bring about breakage and failure of parts. The mandrels are continually subject to large shock forces and rapid thermal expansion of parts, which necessitates very carefully designed parts and repeated maintenance problems. While there have been many attempts to produce a superior mandrel for coiling strip, as exemplified in U.S. Patents Nos. 2,821,348; 2,920,837; 2,941,745; 2,989,263 and 3,085,763; none of these has experienced any real degree of success, particularly, when used in a hot coiler.

The present invention provides a novel mandrel which, although not necessarily so limited, is designed to be used in a hot strip coiler and which is characterized by its simplicity and strong constructon. It can also be adapted for use on cold mill and processing line applications.

One form of the present invention provides a mandrel adapted to coil hot strip material and the like, which includes a longitudinally extending arbor, the arbor having at least four segment restraining surfaces arranged circumferentially around its outer periphery, a radially displaceable segment engageable with each of the restraining surfaces, a plurality of radial bores associated with each segment and formed in said arbor, the outer radial ends of said bores terminating in said surfaces, radially displaceable members received in said bores adapted to extend through the opposite ends thereof and having first wedge surfaces at their radial inner ends, the other end of said members engageable with said segments, a longitudinal central bore formed in said arbor, an actuating rod mounted in the central bore and having a plurality of axially spaced enlarged portions, second wedge surfaces equal in number to the first wedge surfaces formed on said enlarged portions, one of second wedge surfaces being arranged to cooperatively engage one of said first wedge surfaces, and means for axially displacing said rod so as to effect radial displacement of said members and, hence, said segments.

Figure 1:
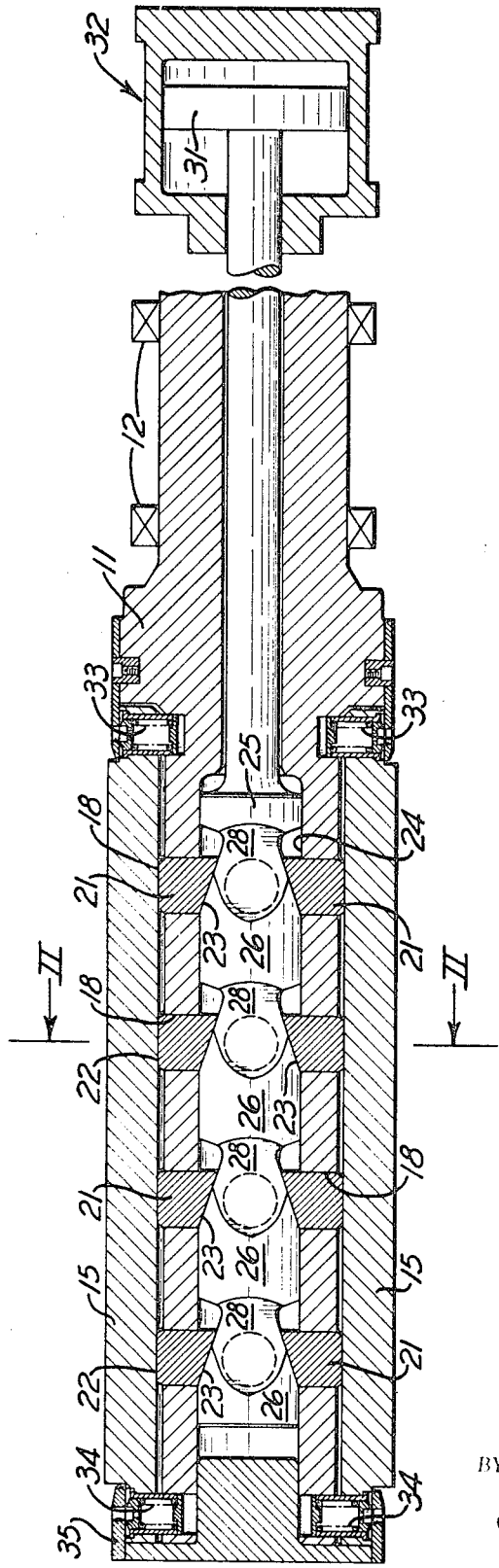
Figure 2:
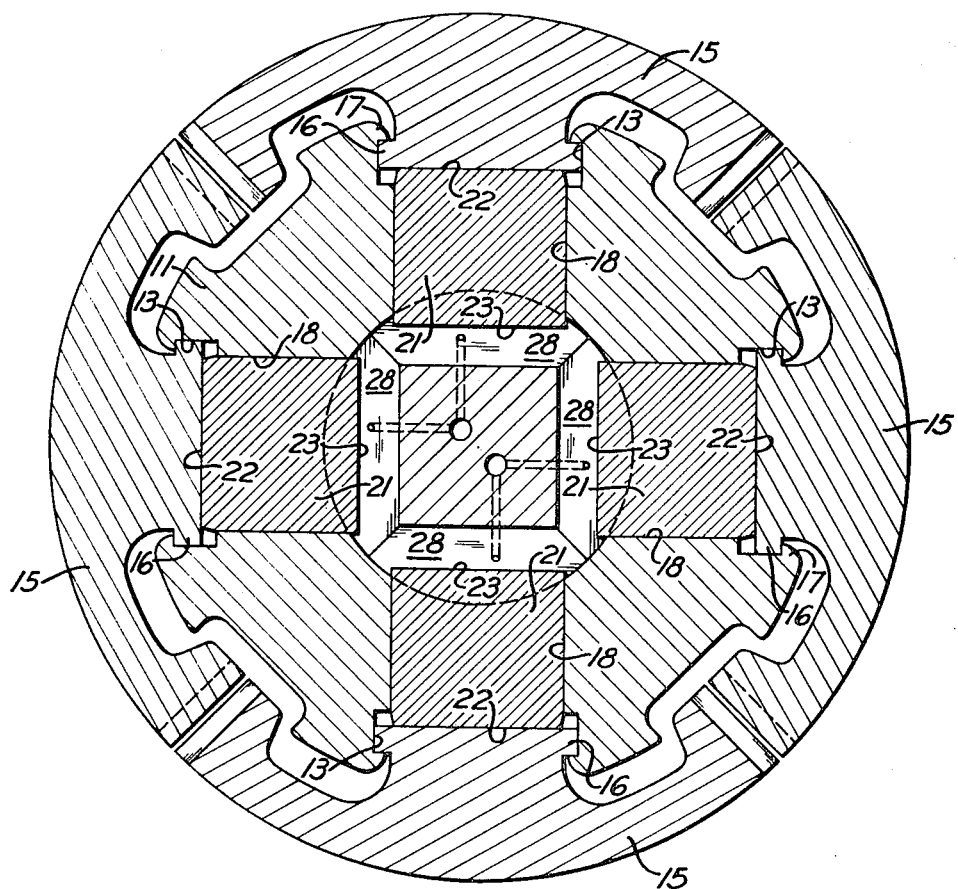

The above features of the present invention, as well as others, will become more appaernt from the following description when read along with the accompanying drawings of which:

FIGURE 1 is a sectional view of a mandrel incorporating the features of the present invention, and FIGURE 2 is a sectional view taken on lines II—II of FIGURE 1.

With reference to FIGURE 1, there is provided a mandrel for use in a downcoiler provided to receive and coil hot metallic strip as produced by a hot strip mill. The mandrel includes a longitudinal extending arbor 11 rotatably mounted in bearings 12, the bearing being received in a stationary frame, not shown. The left-hand side of the arbor 11 is cantilever mounted and extends a distance approximately equal to the maximum width of the strip adapted to be coiled. As shown in FIGURE 2, the arbor is provided with four flat outward surfaces 13, circumferentially and equally spaced around the arbor and adapted to serve as segment supporting and retaining members. Each surface 13 is associated with an outer segment 15, the segments, on their inside, being provided with a pair of opposed projections 16 that engage extension 17 formed on the outer surface of the arbor 11. In this construction there is prevented any tendency of the segments to be thrown out from the mandrel should the reel be operated without any strip around it. The outer surface of the segments is designed to form a truly cylindrical surface in their expanded and contracted position.

Returning now to FIGURE 1 it will be noted that the arbor is provided with a number of radial bores 18, into which are received a like number of pins 21. The pins are generally cylindrical and have outer surfaces 22 engageable with the inside surfaces of the segments and inward radial surfaces formed with wedges 23. In the present construction the pins are not directly connected with the segment. The center of the arbor 11 is provided with a central bore 24 which extends over the entire portion of the mandrel into which there is received an actuating rod 25. The actuating rod is provided with four enlarged portions 26 corresponding to the number of radial sets of pins 21. Each enlarged portion is formed with a wedge 28 complementing the wedges 23 formed on the pins so that for each series of four pins there is one enlarged rod portion that serves to expand and contract that portion of the segments. The slope of the wedge surface is such that on the experience of excessive pressures the actuating rod will be forced backward thereby relieving the mandrel from these pressures that otherwise may cause breakage of its parts. To obtain this relief feature it is important that the environment be such that the lubrication and coefficient of friction on the wedge surfaces are fairly uniform. These surfaces located in the central bore of the arbor are well protected from the entrance of foreign matter and also the heat protection is good as these surfaces are at a distance from the inside of the hot coil. In addition it is possible to internally water cool the mandrel as an additional protection. In addition the central bore forms a container for a supply of lubricant between fillings.

In still referring to the actuating rod 25, it will be noted, to the left of FIGURE 1, it takes the form of a continuous rod, the far end of which is connected to a piston 31 of a piston cylinder assembly 32, the piston cylinder assembly being employed to actuate the rod thereby to control the expansion and contraction of the segments 15.

One feature of the present invention is to provide a very strong arbor, in which respect attention is directed to FIGURE 2, where the large cross section character of the arbor 11 is shown.

The segments are adapted to be urged towards the pins 21 in the usual fashion by springs 33 associated with the segments which are illustrated in FIGURE 1 towards the right-hand side of the arbor. These springs are received in the arbor and exert a force on the segments tending to cause their collapse. The same result, although a little different construction, is achieved by the springs 34 arranged at the outboard end of the reel. In this connection there is provided a cap 35, mounted in the arbor and rotatable therewith, the cap has a spring retainer portion for receiving the springs 34, the springs in this case urging the segments radially inwardly as in the case of the springs 33.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. A collapsible mandrel having a central rotatably mounted longitudinally extending arbor,
   a plurality of equally spaced restraining surfaces arranged circumferentially around the outer periphery of the arbor.
   a segment for each restraining surface, each said segment being constructed and arranged to be restrained by a different one of said restraining surfaces on movement of the segments in a radial direction,
   a plurality of radial bores formed in said arbor, the outer ends of the bores terminating in said segment restraining surfaces,
   radially displaceable members received in said bores being of a length sufficient to extend through the opposite ends of the bores, in which the outer ends engage the segments and the inner ends having first wedge surfaces formed thereon,
   a rod passing through said arbor and having second wedge surfaces formed thereon,
   each second wedge surface being constructed and arranged to engage a different one of said first wedge surfaces in a manner on movement thereof to cause movement of said displaceable members in said bores, and
   means for axially moving said rod so as to effect radial displacement of said displaceable members and radial movement of said segments.

2. A collapsible mandrel according to claim 1, including a longitudinal central bore formed in said arbor,
   said rod mounted in said central bore and arranged to move axially relative to said arbor.

3. A collapsible mandrel according to claim 1, wherein said rod is formed with a plurality of axially spaced enlarged portions and wherein said second wedge surfaces are formed on at least a portion of said enlarged portions.

References Cited

UNITED STATES PATENTS

| | | | |
|---|---|---|---|
| 2,564,482 | 8/1951 | Kentis | 242—72.1 |
| 2,941,745 | 6/1960 | Perrine | 242—72.1 |
| 3,379,389 | 4/1968 | O'Keefe | 242—72.1 |

NATHAN L. MINTZ, *Primary Examiner.*